United States Patent
Keber et al.

(10) Patent No.: US 11,226,109 B2
(45) Date of Patent: Jan. 18, 2022

(54) FLOOR WARMING SYSTEMS WITH WEATHER COMPENSATION

(71) Applicant: WATTS REGULATOR CO., North Andover, MA (US)

(72) Inventors: Micheal Keber, Lake Country (CA); Dustin Allcorn, Republic (MO); Jason Vath, Coldstream (CA); Iain Kendal, Vernon (CA); David Beriault, Vernon (CA)

(73) Assignee: WATTS REGULATOR CO., North Andover, MA (US)

( * ) Notice: Subject to any disclaimer, the term of this patent is extended or adjusted under 35 U.S.C. 154(b) by 3 days.

(21) Appl. No.: 15/753,279

(22) PCT Filed: Jul. 29, 2016

(86) PCT No.: PCT/US2016/044748
§ 371 (c)(1),
(2) Date: Feb. 17, 2018

(87) PCT Pub. No.: WO2017/030769
PCT Pub. Date: Feb. 23, 2017

(65) Prior Publication Data
US 2018/0238565 A1    Aug. 23, 2018

Related U.S. Application Data

(60) Provisional application No. 62/207,105, filed on Aug. 19, 2015.

(51) Int. Cl.
*F24D 19/10* (2006.01)
*F24D 13/02* (2006.01)
*G05D 23/19* (2006.01)

(52) U.S. Cl.
CPC ......... *F24D 19/1096* (2013.01); *F24D 13/02* (2013.01); *G05D 23/1902* (2013.01);
(Continued)

(58) Field of Classification Search
None
See application file for complete search history.

(56) References Cited

U.S. PATENT DOCUMENTS

| 4,337,893 A | 7/1982 | Flanders et al. |
| 4,582,249 A | 4/1986 | Nelson |

(Continued)

FOREIGN PATENT DOCUMENTS

| EA | 016524 B1 | 5/2012 |
| WO | 2012061795 A2 | 5/2012 |

OTHER PUBLICATIONS

International Search Report and Written Opinion for international application No. PCT/US2016/044748 dated Nov. 10, 2016.

*Primary Examiner* — Sean Shechtman
(74) *Attorney, Agent, or Firm* — Day Pitney LLP; George N. Chaclas (57) ABSTRACT

A floor warming system includes floor warming elements for coupling to a floor and a first sensor assembly for generating a first signal indicative of at least one of a floor temperature and a floor warming element temperature. A thermostat controller receives the first signal and a second signal indicating an ambient outdoor temperature for controlling operation of the floor warming elements. The thermostat controller includes memory storing an instruction set and data related to a user setpoint and a processor for running the instruction set. The processor is operative to calculate an operational floor setpoint based on the first signal, the second signal and the user setpoint.

7 Claims, 11 Drawing Sheets

(52) U.S. Cl.
CPC ..... *G05D 23/1928* (2013.01); *G05D 23/1931* (2013.01); *Y02B 30/00* (2013.01)

(56) References Cited

U.S. PATENT DOCUMENTS

| | | | |
|---|---|---|---|
| 4,843,084 A | 6/1989 | Parker et al. | |
| 5,024,265 A | 6/1991 | Buchholz et al. | |
| 5,192,020 A | 3/1993 | Shah | |
| 5,971,284 A | 10/1999 | Hammer | |
| 6,711,471 B2 | 3/2004 | Kidder | |
| 2005/0288822 A1* | 12/2005 | Rayburn | F24F 11/30 700/276 |
| 2007/0267508 A1 | 11/2007 | Hoglund et al. | |
| 2009/0001186 A1 | 1/2009 | Cohen | |
| 2009/0048719 A1* | 2/2009 | McLaughlin | F24D 19/1009 700/299 |
| 2010/0070086 A1* | 3/2010 | Harrod | G05B 19/042 700/276 |
| 2012/0118985 A1* | 5/2012 | Soderlund | F24F 11/0001 236/49.3 |
| 2013/0018513 A1* | 1/2013 | Metselaar | G05D 23/1902 700/278 |
| 2013/0306620 A1* | 11/2013 | Halloran | H05B 1/0227 219/483 |
| 2015/0108230 A1 | 4/2015 | Cloonan et al. | |
| 2015/0134124 A1* | 5/2015 | Carter | G05D 23/1923 700/278 |
| 2015/0373926 A1* | 12/2015 | Park | A01G 9/242 236/1 C |

\* cited by examiner

FLOOR WARMING SYSTEMS WITH WEATHER COMPENSATION

CROSS-REFERENCE TO RELATED APPLICATIONS

This application is a U.S. national stage application under 35 U.S.C. 371 of co-pending International Application No. PCT/US2016/044748 filed on Jul. 29, 2016, which in turn claims priority to U.S. Provisional Application No. 62/207,105 filed on Aug. 19, 2015, the contents of which are incorporated by reference herein in their entirety for all purposes.

BACKGROUND OF THE INVENTION

1. Field of the Invention

The subject disclosure relates to methods for operation of floor warming systems, and more particularly to improved use of weather and other variable compensation in floor warming systems.

2. Background of the Related Art

Bathroom floors, kitchens, foyers and the like often have tile flooring. The inherently "cold" nature of such floors makes it desirable to provide a system to warm these floors. Common systems provide electrical cables or hot water tubing for such floor heating. Typical floor warming systems have a thermostat with a fixed floor warming setpoint. During mild outdoor conditions, the heating of the floor warming system to the fixed floor warming setpoint may result in overheating the interior space. As a result, the space becomes undesirably uncomfortable and the system is inefficient. To address this overheating, the thermostat may include a maximum room temperature setting that is used to turn off the floor warming function when the interior space exceeds the maximum room temperature setting.

Alternatively, the thermostat may operate to maintain the interior space at an air temperature set point. However, air temperature setpoint operation may result in the floor becoming undesirably cold or hot. Further, the air temperature setpoint operation may cause the floor warming thermostat to fight against the primary heating/cooling thermostat. Although floor minimum and maximum temperature settings can be used to keep the floor comfortable, the primary heating/cooling thermostat and system overwhelming the floor warming thermostat cannot be prevented.

Some floor heating systems operate as the primary source to heat the interior. In a hydronic floor heating system, the supply water has a setpoint. When the supply water temperature is changed, the floor temperature will also change in response.

Further, thermostats often have additional features such as digital display, a clock, and the like so that additional features can be provided. A common feature is the ability to program the operation. Programming allows the user to set the time periods when they can tolerate a lower floor temperature, such as, say, when they are sleeping, and to select time periods when they prefer a warmer floor temperature, such as, say, when they arise in the morning. Clearly, this feature provides the user with convenience and allows the user to save energy by warming the floor only when it is expected to be used.

SUMMARY OF THE INVENTION

In one embodiment, the subject disclosure is directed to reducing energy costs and improving comfort of floor warming systems. In one embodiment, the floor surface target temperature is changed in response to weather.

The subject technology is also directed to a thermostat controller for a floor warming system including memory storing an instruction set and data related to a user setpoint. A processor runs the instruction set so that the processor is operative to: receive and store a first signal indicating an environmental parameter; calculate an operational setpoint based on the first signal and the user setpoint; and control operation of floor warming elements in the floor warming system.

One embodiment of the subject technology is directed to a floor warming system including floor warming elements for coupling to a floor and a first sensor assembly for generating a first signal indicative of at least one of a floor temperature and a floor warming element temperature. A thermostat controller receives the first signal and a second signal indicating an ambient outdoor temperature for controlling operation of the floor warming elements. The thermostat controller includes memory storing an instruction set and data related to a user setpoint and a processor for running the instruction set. The processor is operative to calculate an operational floor setpoint based on the first signal, the second signal and the user setpoint.

The operational floor setpoint may be equal to the user setpoint plus a product of a gain constant times a difference of a reference outdoor temperature minus the ambient outdoor temperature, the reference outdoor temperature being an outdoor temperature for which zero compensation is required. The gain constant is user-selectable such as a value in a range of 0.09 to 0.21. The processor may also be further operative to: determine if the operational floor setpoint is below a predetermined minimum, wherein if the operational floor setpoint is below the predetermined minimum, the operational floor setpoint is reset equal to the predetermined minimum; and subsequently, determine if the operational floor setpoint is above a predetermined maximum, wherein if the operational floor setpoint is above the predetermined maximum, the operational floor setpoint is reset equal to the predetermined maximum.

Another embodiment of the subject technology is directed to a thermostat controller for a floor warming system having memory storing an instruction set and data related to a user setpoint and a processor for running the instruction set. The processor is operative to: receive and store a first signal indicating an environmental parameter; calculate an operational setpoint based on the first signal and the user setpoint; and control operation of floor warming elements in the floor warming system based on the operational setpoint. The processor may be further operative to receive and store a second signal indicative of a temperature of the floor and modify the operational setpoint based on the second signal. The environmental parameter can be selected from the group consisting of ambient outdoor temperature, indoor relative humidity, floor temperature, barometric pressure, and combinations thereof. Preferably, the operation setpoint is calculated at least once per second.

In one embodiment, the environmental parameter is indoor relative humidity, and the operational setpoint is equal to the user setpoint minus a product of a humidity gain (mH) times a difference of an ambient indoor humidity minus a preset reference humidity. An examplary mH is 0.2.

Still another embodiment of the subject technology is directed to a thermostat controller for a floor warming system having memory storing an instruction set and data related to a user setpoint, and a processor for running the instruction set. The processor is operative to receive and store a first signal indicating a barometric pressure. An operational setpoint is calculated based on the first signal and the user setpoint, wherein the operational setpoint is equal to the user setpoint minus a product of a barometric pressure gain times a difference of an ambient barometric pressure minus a preset reference barometric pressure. Operation of floor warming elements in the floor warming system is controlled based on the operational setpoint. The processor may be further operative to receive and store a second signal indicative of a temperature of the floor and modify the operational setpoint based on the second signal.

It should be appreciated that the subject technology can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the following drawings.

DETAILED DESCRIPTION OF PREFERRED EMBODIMENTS

The subject technology overcomes many of the prior art problems associated with floor warming systems. The advantages, and other features of the systems and methods disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

Figure 1:
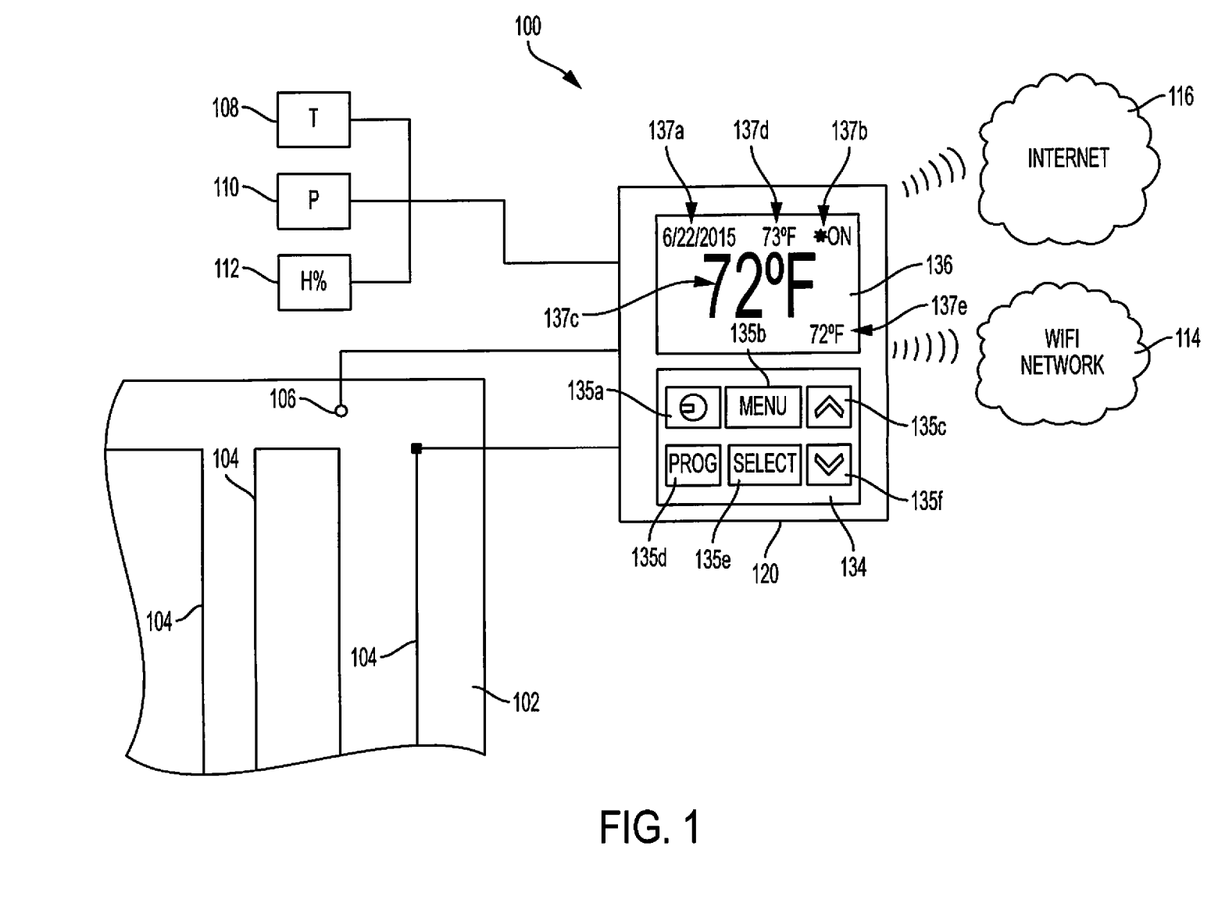
FIG. 1 is a diagram showing a floor warming arrangement in accordance with the subject disclosure.

Referring now to FIG. 1, a somewhat schematic diagram showing floor warming arrangement 100 in accordance with the subject disclosure is shown. The floor warming arrangement 100 easily and efficiently maintains a comfortable floor temperature. The following discussion describes the overall structure of such a floor warming arrangement 100 but further discussion of the applications, programs and data that embody the methodology of the present disclosure is described elsewhere herein.

The warming arrangement 100 includes a floor area 102 having one or more heating elements 104. For simplicity, only a portion of the floor area 102 is shown. It is envisioned that the heating elements 104 create a grid under the entire floor area. The heating elements 104 may be electric cables, hot water tubing and the like as is well known in the art. As shown, the heating elements 104 are electric cables. The floor area 102 also includes a temperature sensor 106 embedded in the floor area 102.

The heating elements 104 and temperature sensor 106 are in communication with a thermostat controller 120. The thermostat controller 120 is also in communication with a plurality of sensors such as an outdoor temperature sensor 108, a barometric pressure sensor 110, and a humidity sensor 112. Although single sensors 108, 110, 112 are shown for simplicity, each parameter may have a plurality of sensors. These sensors 108, 110, 112 may be indoors and/or outdoors. The thermostat controller 120 is also able to communicate with various networks such as a local network 114 and the Internet 116. Communication between the thermostat controller 120 and various devices 108, 110, 112, 114, 116 may be wired or wireless as is well known. The thermostat controller 120 can also communicate with other devices such as a cell phone or personal computer (not shown) for remote control as described below.

Figure 2:
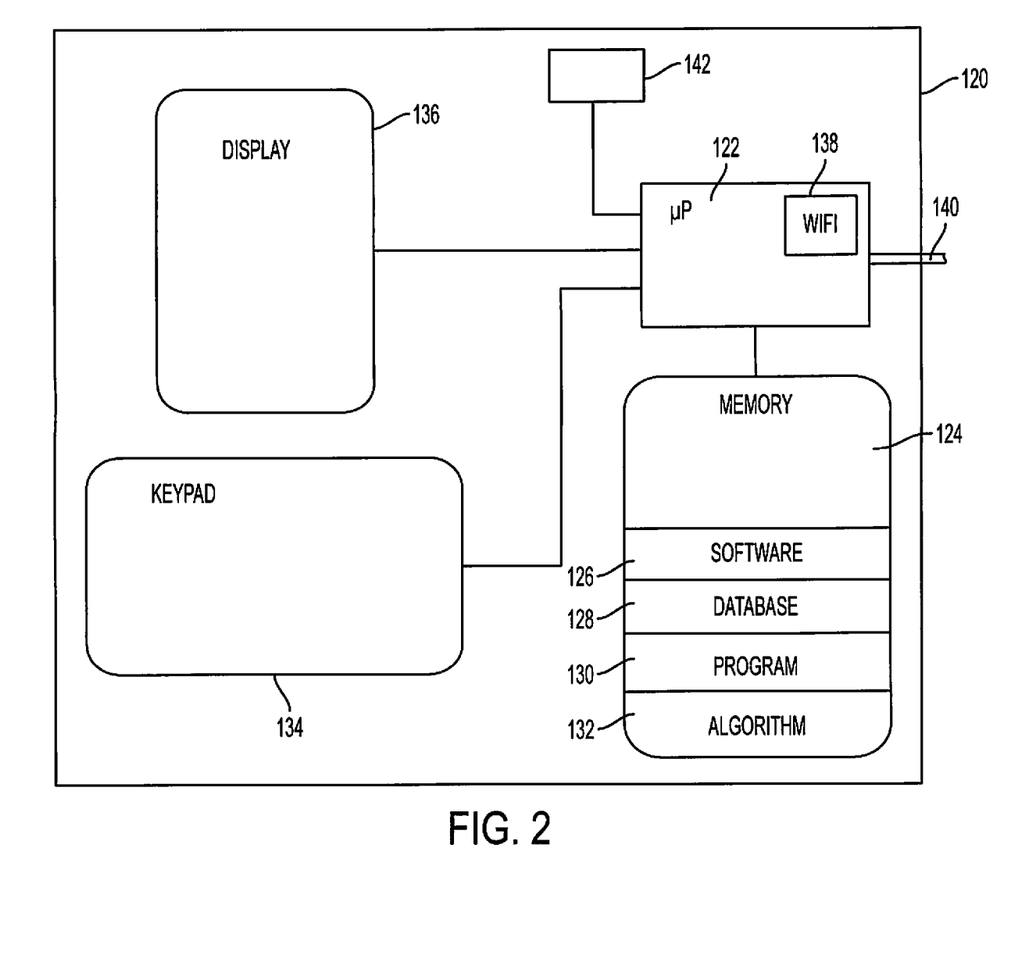
FIG. 2 is a block diagram of a thermostat controller implemented in accordance with the subject disclosure.

Referring now to FIG. 2, a somewhat schematic block diagram of the thermostat controller 120 implemented in accordance with the subject disclosure is shown. The thermostat controller 120 preferably includes a printed circuit board with components for receiving, processing, displaying, and/or transmitting digital and/or analog data. The thermostat controller 120 includes one or more digital data processing devices particularly suited to work in various embodiments of the subject disclosure.

The thermostat controller 120 includes a processor 122, which is generally logic circuitry that responds to and processes instructions. The processor 122 can include, without limitation, a central processing unit, an arithmetic logic unit, an application specific integrated circuit, a task engine, and/or any combinations, arrangements, or multiples thereof not explicitly shown. The processor 122 also can include a WiFi module 138. The processor 122 is in communication with memory 124.

Typical memory 124 includes random access memory (RAM), rewritable flash memory, read only memory (ROM), mechanisms and structures for performing I/O operations, and a storage medium such as a magnetic hard disk drive(s). The memory 124 may be a combination of integral and external components. The memory 124 includes software 126 and a plurality of modules 128, 130, 132 as needed to perform the functions of the subject technology.

For example, the software 126 may include an operating system for execution on the processor 122. Software or code generally refers to instructions which, when executed on one or more digital data processing devices, cause interactions with operating parameters, sequence data/parameters, database entries, network connection parameters/data, variables, constants, software libraries, and/or any other elements needed for the proper execution of the instructions, within an execution environment in memory.

The memory 124 also has plurality of modules. A module is a functional aspect, which may include software and/or hardware. Typically, a module encompasses the necessary components to accomplish a task. It is envisioned that the same hardware (e.g., memory and processor) could implement a plurality of modules and portions of such hardware being available as needed to accomplish the task.

For example, a database module 128 creates, stores and maintains data and multiple databases necessary for the proper operation of the subject technology. A program module 130 stores an instruction set to allow the operator to program operation of the thermostat controller 120. An algorithm module 132 stores an instruction set to allow the processor to apply one or more algorithms to operation of the thermostat controller 120 as well as vary the actual algorithms according to user input.

The thermostat controller 120 also has input and output devices such as a keypad 134 and display 136, respectively. The keypad 134 may have any number of buttons, dials, selector switches, touchpads and the like as necessary to accomplish operation in accordance with the subject technology. Similarly, the display 136 may have a plurality of different screens. Each screen may have areas that display various information as icons, graphics, numbers, letters, etc. as necessary to accomplish operation in accordance with the subject technology. The display 136 may also be touchscreen to receive user input.

The thermostat controller 120 also includes various other circuitry 142 (not drawn distinctly) as needed for proper operation. For example, the circuitry 142 may include integral A/D conversion circuitry, an integral display driver, a peripheral eeprom (non-volatile rewriteable memory for storing user settings and the like), an external flash memory chip (for in-field software updates), an external WIFI radio which includes built-in IP stack and WIFI encryption functionality, various connection ports and the like.

As best seen in FIG. 1, the keypad 134 includes a plurality of buttons 135*a-f*. For example, the buttons 135*a-f* are a power button 135*a*, a menu button 135*b*, an up button 135*c*, a program button 135*d*, a select button 135*e*, and a down button 135*f*. The display 136 includes areas 137*a-e* for displaying information. For example, the display 136 includes a date area 137*a*, a status area 137*b*, a room temperature area 137*c*, an operational setpoint area 137*d*, and a floor temperature area 137*e*. In another embodiment, the display 136 includes a touchscreen that presents the keypad 134 and other interactive buttons. In still another embodiment, the thermostat controller 120 is optinally run remotely from a personal device such as a cell phone, tablet, phablet etc.

Still referring to FIG. 2, the WiFi module 138 can connect to wired communication channels 140 to facilitate communication with external sensors, networks, devices, elements and the like. Although drawn as part of the processor 122, the WiFi module 138 may be separate or otherwise incorporated into the floor warming arrangement 100. Similarly, those of ordinary skill will recognize that the hardware, software, modules, sensors, elements, devices and various processes discussed herein are merely exemplary of the hardware and functionality performed by the disclosed technology and thus such hardware and processes (and/or their equivalents) may be implemented in commercial embodiments in various combinations without materially affecting the operation of the disclosed technology. It is also envisioned that the thermostat controller 120 and/or other components may be incorporated into a more comprehensive home/site controller that controls the operation of additional systems (e.g., heating and air conditioning) along with additional sensors (e.g., refrigerator compressor) and the like.

In brief overview, the disclosed technology relates to compensation of the operation of a floor warming arrangement based on various parameters. As a result of the compensation, the floor warming arrangement performs not only more efficiently, but the interior space is more comfortable. The following flow charts herein illustrate the structure or the logic of the present technology, possibly as embodied in program software for execution on the processor 122 of the thermostat controller 120. Those skilled in the art will appreciate that the flow charts illustrate the structures of the program software or code elements, which may include logic circuits on an integrated circuit, that function according to the present technology. As such, the present technology may be practiced by a machine component that renders the program software in a form that instructs a processor to perform a sequence of function steps corresponding to those shown in the flow charts and equivalents.

Figure 3A:
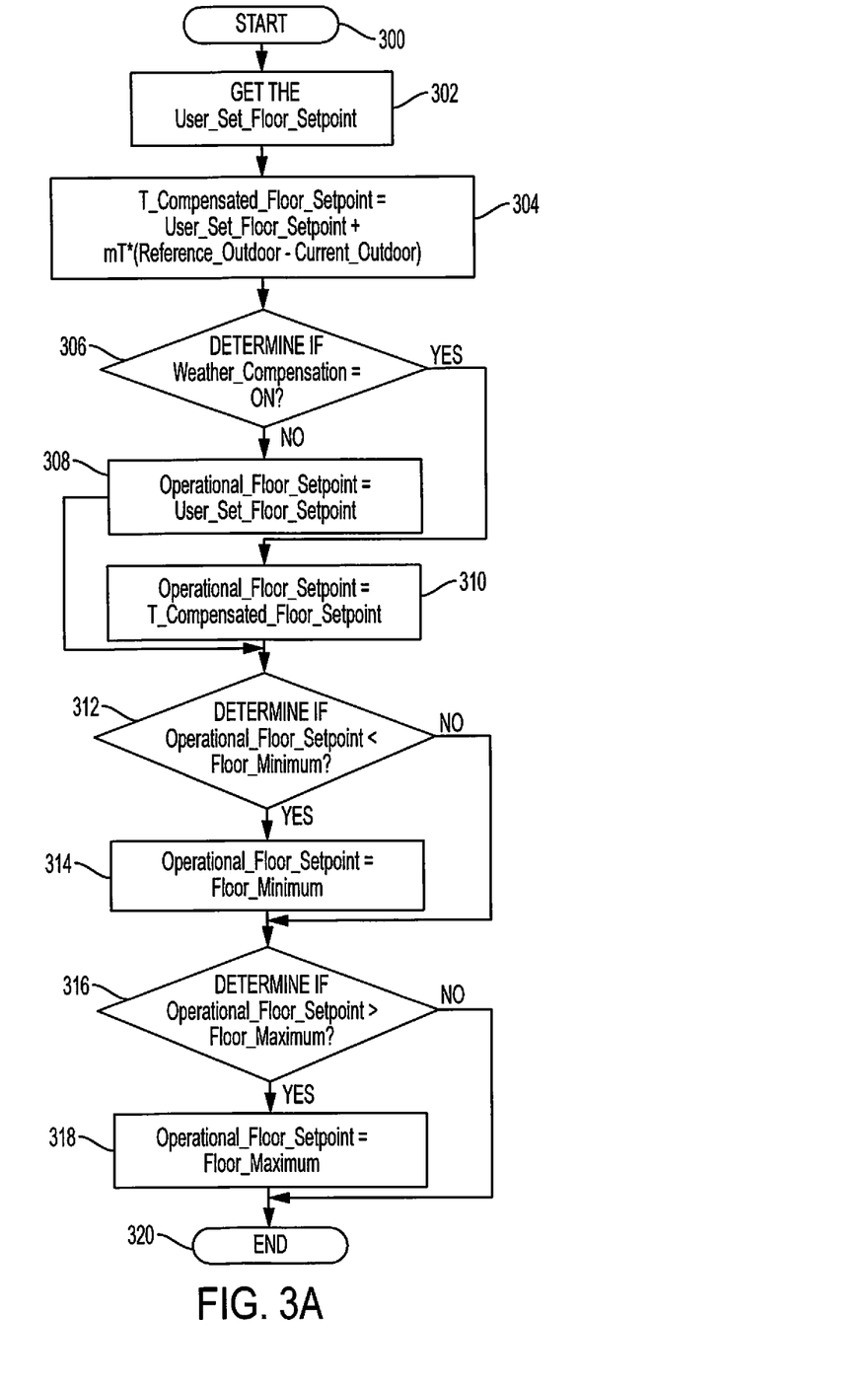
FIG. 3A is a flowchart depicting a process for warming a floor utilizing outdoor temperature compensation in accordance with the subject disclosure.

Referring now to FIG. 3A, there is illustrated a flowchart depicting a process for warming a floor utilizing outdoor temperature compensation in accordance with an embodiment of the present technology. It is envisioned that the keypad 134 of the thermostat controller 120 is utilized by an operator to enter the information as needed. It is also preferred that the flowchart of FIG. 3A is performed frequently such as at least once per second.

In overview, the flowchart of FIG. 3A is to receive a user configured floor setpoint and increase or decrease the floor setpoint automatically according to local outdoor temperature. The flowcharts of FIGS. 3A, 4A and 5A uses the following labels shown in Table 1.

TABLE 1

| Label | Definition |
| --- | --- |
| User_Set_Floor_Setpoint | The user configured floor setpoint before weather compensation for temperature is applied |
| T_Compensated_Floor_Setpoint | The calculated floor setpoint after the weather compensation is applied |
| Operational_Floor_Setpoint | The final floor setpoint user for floor warming operation |
| Reference_Outdoor_Temperature | The outdoor temperature for which the weather compensation algorithm calculate zero compensation is required for outdoor temperature variance (i.e., T_Compensated_Floor_Setpoint = User_Set_Floor_Setpoint) |

TABLE 1-continued

| Label | Definition |
| --- | --- |
| Weather_Compensation | The user configured on/off setting determining if the user wishes to turn on the automatic weather compensation algorithm |
| mT | The gain of the weather compensation applied to outdoor temperature |
| Current_Outdoor | The current outdoor temperature either measured locally or communicated to the thermostat controller 120 from a temperature sensor 108, another device on the network 114 or obtained from a weather service via the Internet 116 |
| Floor_Minimum | The preset or user configured minimum allowed floor setpoint, which limits the lowest value the weather compensation algorithm can produce/return |
| Floor_Maximum | The preset or user configured maximum allowed floor setpoint, which limits the highest value the weather compensation algorithm can produce/return |
| H_Compensated_Floor_Setpoint | The calculated floor setpoint after the weather compensation for humidity is applied |
| Reference_Humidity | The humidity for which the weather compensation algorithm calculate zero compensation is required to correct for humidity variance (i.e., H_Compensated_Floor_Setpoint = User_Set_Floor_Setpoint) |
| mH | The gain of the weather compensation applied to indoor humidity |
| Current_Humidity | The current indoor humidity either measured locally or communicated to the thermostat controller 120 from a humidity sensor 112 directly or on the network 114 |
| User_Adjustment_Keystrokes | User keystrokes such as depression of the increase key 135c or decrease key 135f to manually increase or decrease the current operational floor setpoint |

Figure 3B:
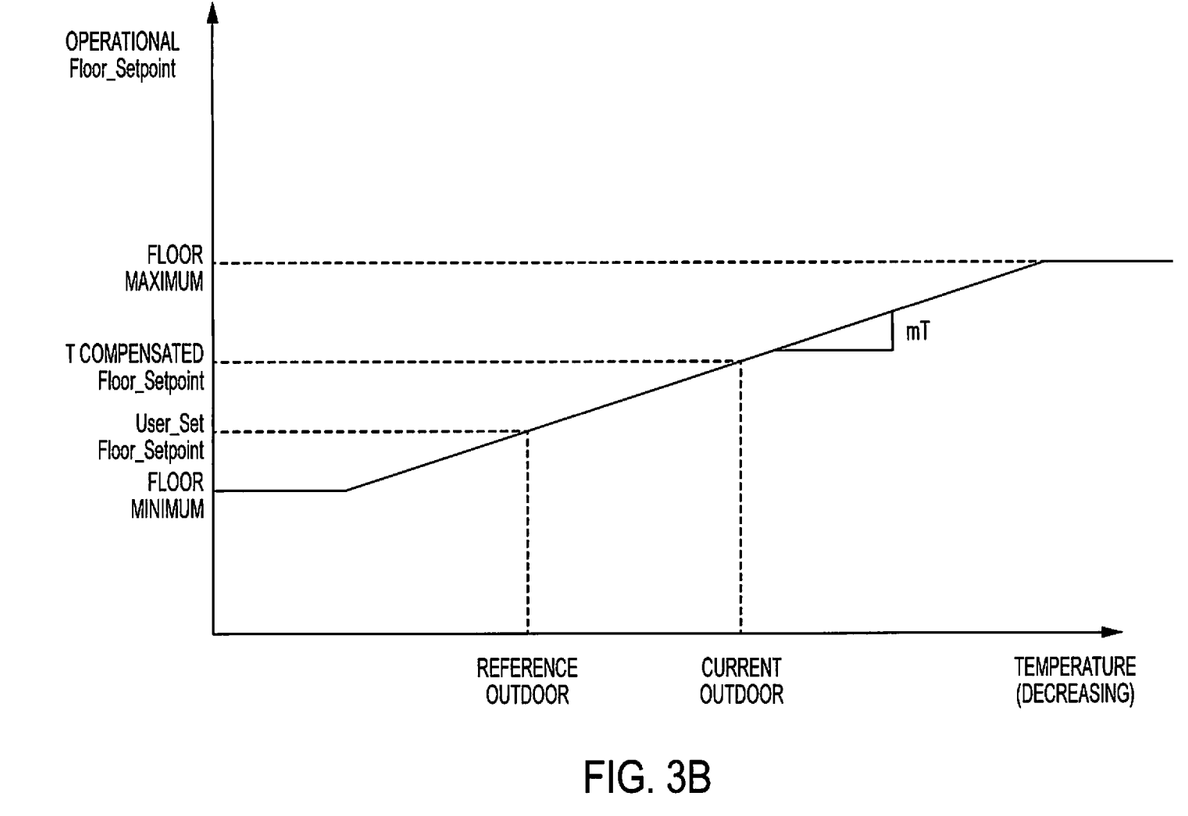
FIG. 3B is graphical chart representing Operational_Floor_Setpoint versus Decreasing Temperature illustrating the general principle of outdoor temperature weather compensation in accordance with the subject disclosure.

At step 300, the process of the flowchart begins. The flowchart typically begins under ongoing operation circumstances as opposed to an initial start-up condition. At step 302, the thermostat controller 120 checks a User_Set_Floor_Setpoint stored in the database 128. The User_Set_Floor_Setpoint is the temperature setpoint before weather compensation is applied. Referring additionally to FIG. 3B, the User_Set_Floor_Setpoint is shown on a graph of Operational_Floor_Setpoint versus Outdoor Temperature. The Operational_Floor_Setpoint is the final floor setpoint used for floor warming operation.

At step 304, the thermostat controller 120 determines the T_Compensated_Floor_Setpoint, which is equal to the User_Set_Floor_Setpoint plus the product of the gain mT of the weather compensation times the difference of the Reference_Outdoor temperature minus the Current_Outdoor temperature. The T_Compensated_Floor_Setpoint is also shown on FIG. 3B.

At step 306, the thermostat controller 120 determines if the user has elected to turn on weather compensation (Weather_Compensation). If so, the process proceeds to step 310 where the weather compensation algorithm Operational_Floor_Setpoint equal to the T_Compensated_Floor_Setpoint. If weather compensation is off, the process proceeds to step 308 wherein the Operational_Floor_Setpoint is made equal to the User-Set_Floor_Setpoint. Both of steps 308 and 310 proceed to step 312.

At step 312, the thermostat controller 120 determines if the Operational_Floor_Setpoint is below a Floor_Minimum. The Floor_Minimum is a preset minimum allowed floor setpoint, which may be a standard or user selected. If the Operational_Floor_Setpoint is below the Floor_Minimum, the process proceeds to step 314. At step 314, the Operational_Floor_Setpoint is set equal to the Floor_Minimum and the process proceeds to step 316.

At step 312, if the Operational_Floor_Setpoint is equal to or above the Floor_Minimum, the process proceeds to step 316. At step 316, the thermostat controller 120 determines if the Operational_Floor_Setpoint is above a Floor_Maximum. The Floor_Maximum is a preset maximum allowed floor setpoint, which may be a standard or user selected. If the Operational_Floor_Setpoint is above the Floor_Maximum, the process proceeds to step 318. At step 318, the Operational_Floor_Setpoint is set equal to the Floor_Maximum and the process proceeds to step 320, where the process ends. At step 316, if the Operational_Floor_Setpoint is equal to or below the Floor_Maximum, the process proceeds to step 320, where the process ends.

It is noted that the order of checking Floor_Minimum first and then Floor_maximum is preferred. In the case where both Floor_Minimum and the Floor_Maximum are user adjustable and not interlocked in the user interface, it may be possible to set a Floor_Minimum greater than a Floor_Maximum. In this case, the thermostatic controller 120 checks the maximum last and operates on that value. Thus, the Floor_Maximum may prevent overheating of a surface which could be damaged by overheating (e.g., hardwood floors).

Figure 3C:
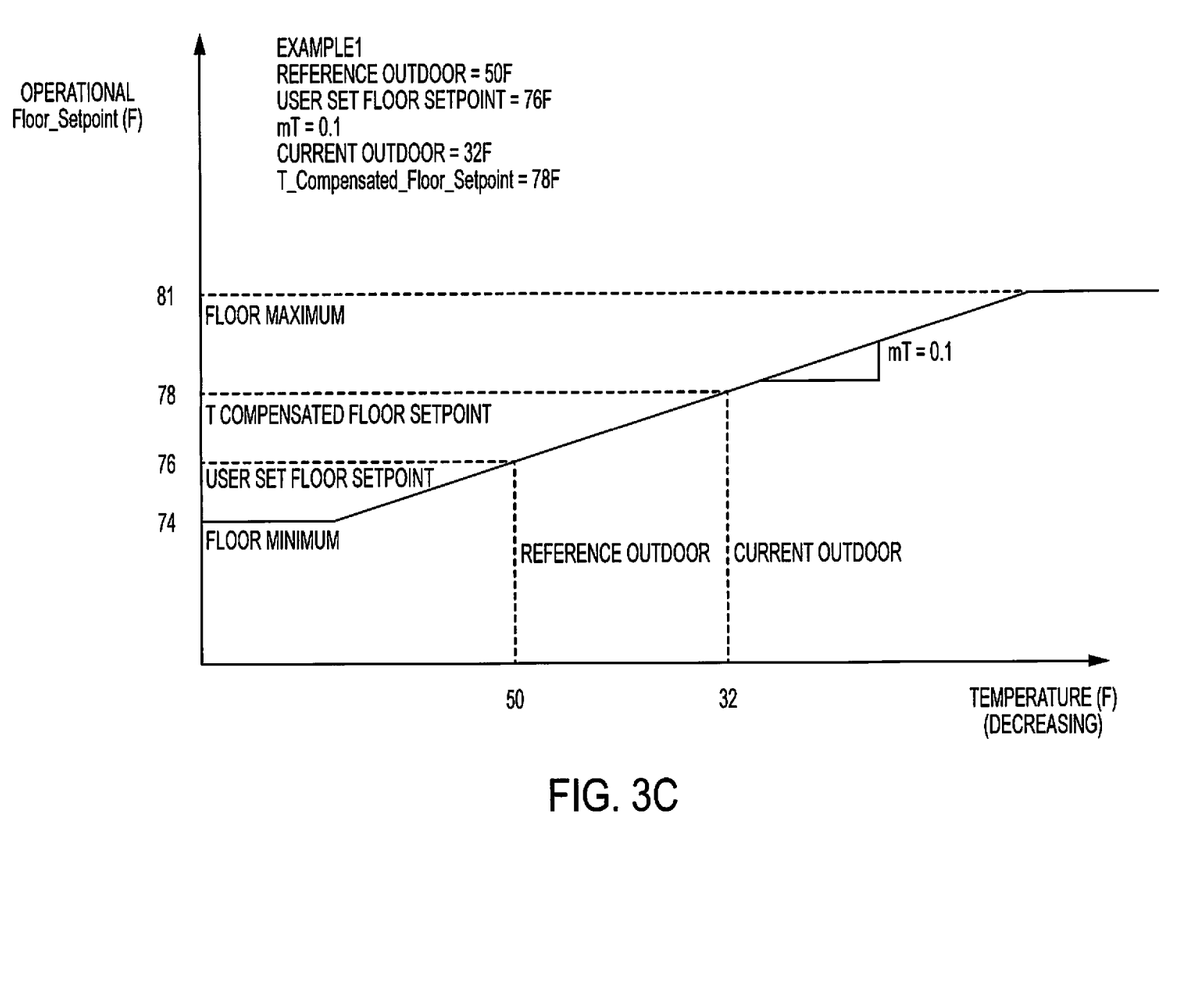
FIG. 3C is graphical chart representing Operational_Floor_Setpoint versus Decreasing Temperature illustrating weather compensation when the outdoor temperature is colder than the reference outdoor temperature in accordance with the subject disclosure.

FIG. 3C is graphical chart representing an example of Operational_Floor_Setpoint versus Decreasing Temperature illustrating weather compensation when the outdoor temperature is colder than the reference outdoor temperature in accordance with the subject disclosure. FIG. 3C includes an example of typical parameters to yield a weather compensated floor setpoint (T_Compensated_Floor_Setpoint) of 78° F. when rounded off to the nearest integer. In particular, the T_Compensated_Floor_Setpoint equals the User_Set_Floor_Setpoint (76° F.) plus the gain mT (0.1) times the difference of the Reference_Outdoor (50° F.) and Current_Outdoor (32° F.). In other words, the T_Compensated_Floor_Setpoint=76+0.1(50−32)=77.8° F. It is envisioned that more accurate control may be utilized so that, in the example of FIG. 3C, the T_Compensated_Floor_Setpoint would be 77.8° F.

Figure 3D:
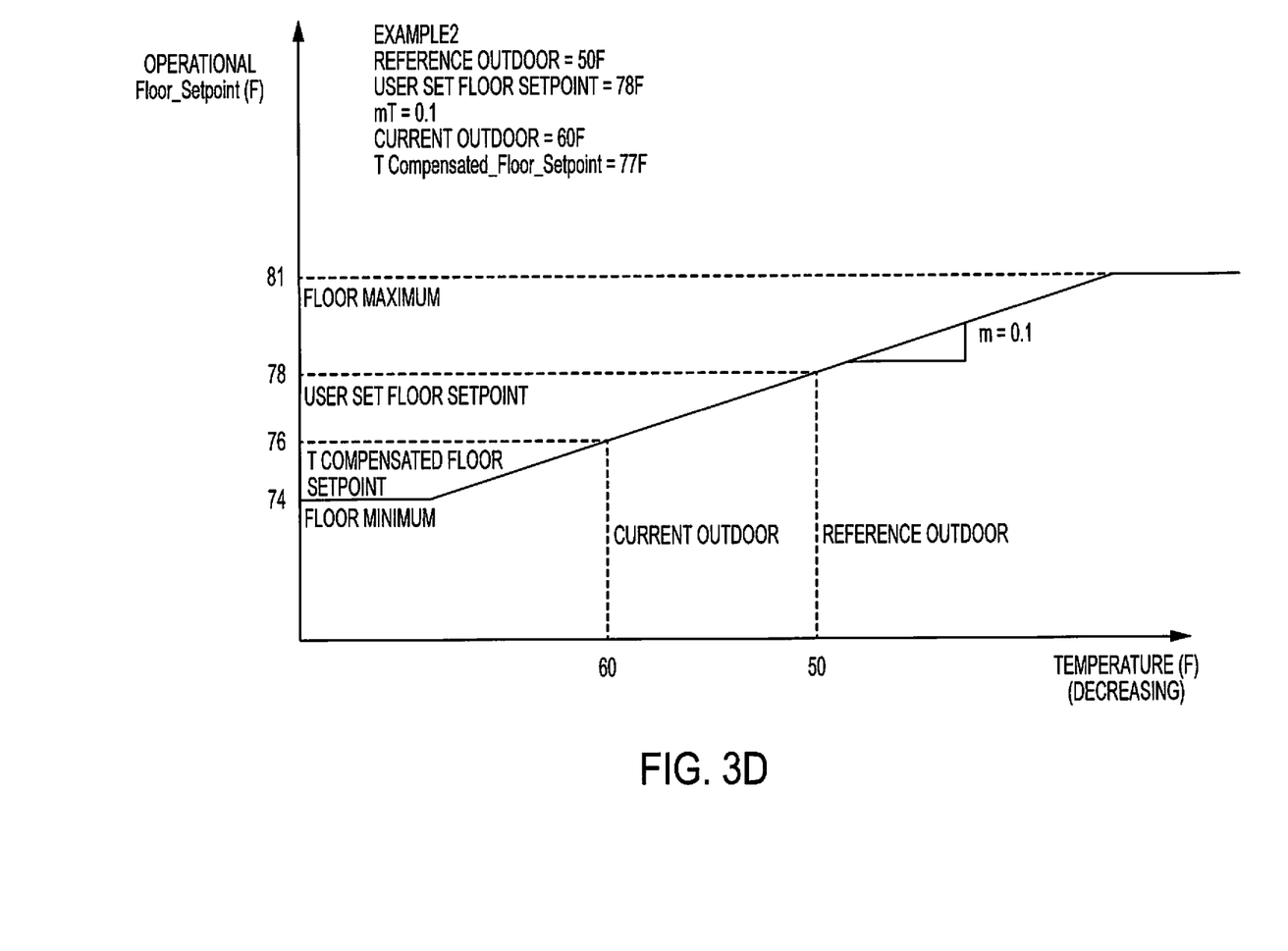
FIG. 3D is graphical chart representing Operational_Floor_Setpoint versus Decreasing Temperature illustrating weather compensation when the outdoor temperature is warmer than the reference outdoor temperature in accordance with the subject disclosure.

FIG. 3D is graphical chart representing Operational_Floor_Setpoint versus Decreasing Temperature illustrating weather compensation when the outdoor temperature is warmer than the reference outdoor temperature in accordance with the subject disclosure. FIG. 3D includes an example of typical parameters to yield a weather compensated floor setpoint (T_Compensated_Floor_Setpoint) of 77° F. In particular, the T_Compensated_Floor_Setpoint=78+0.1(50−60)=77.0° F. In another embodiment, mT is equal to 0.2 although it is understood selection of the value of mT is variable depending upon the system and circumstantial parameters.

Figure 4A:
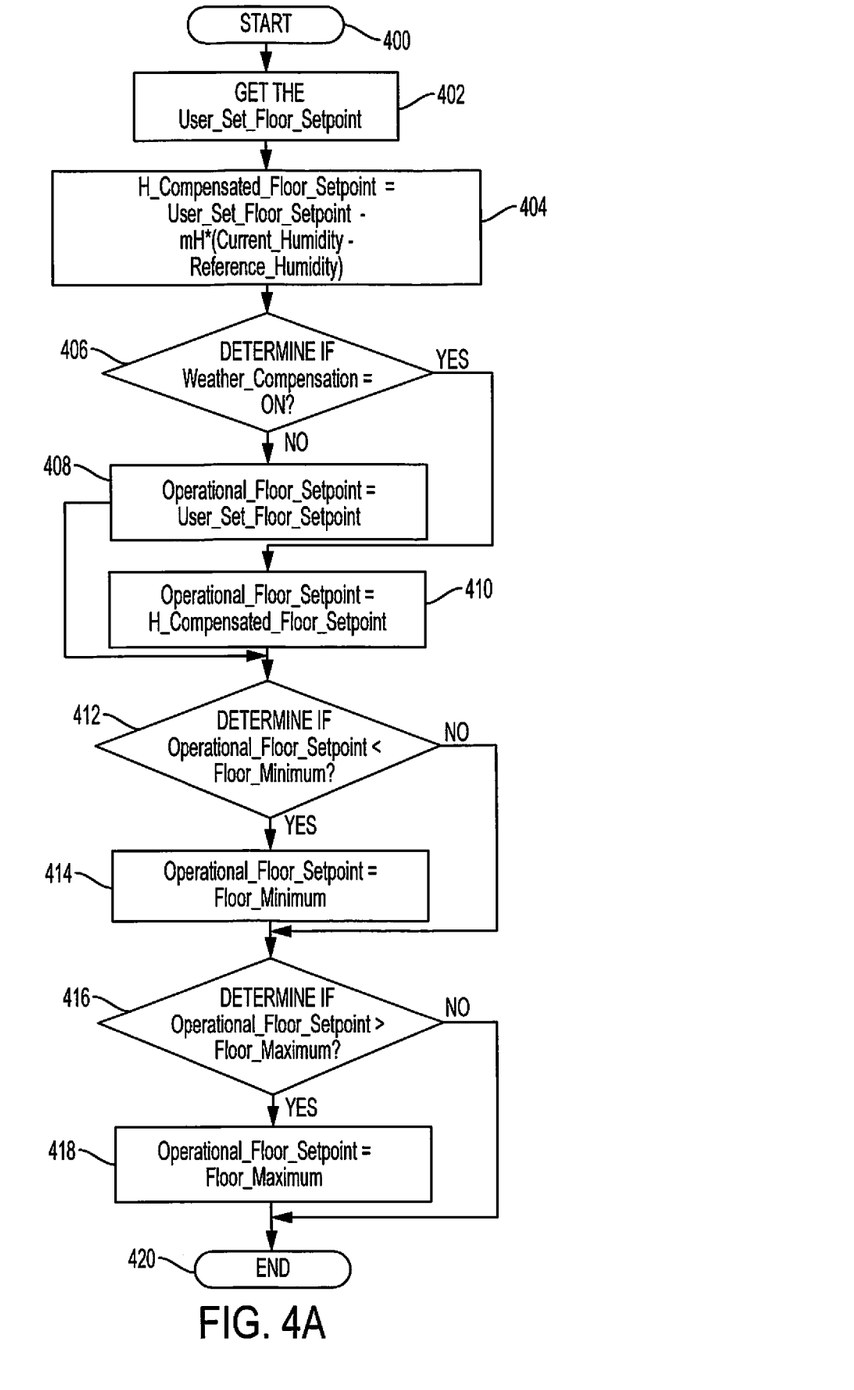
FIG. 4A is a flowchart depicting a process for warming a floor utilizing indoor humidity compensation in accordance with the subject disclosure.

Referring now to FIG. 4A, there is illustrated a flowchart depicting a process for weather compensation based on indoor humidity in accordance with the subject technology. It is envisioned that the flowchart of FIG. 4A is performed frequently such as at least once per second. At step 400, the process of flowchart begins.

Figure 4B:
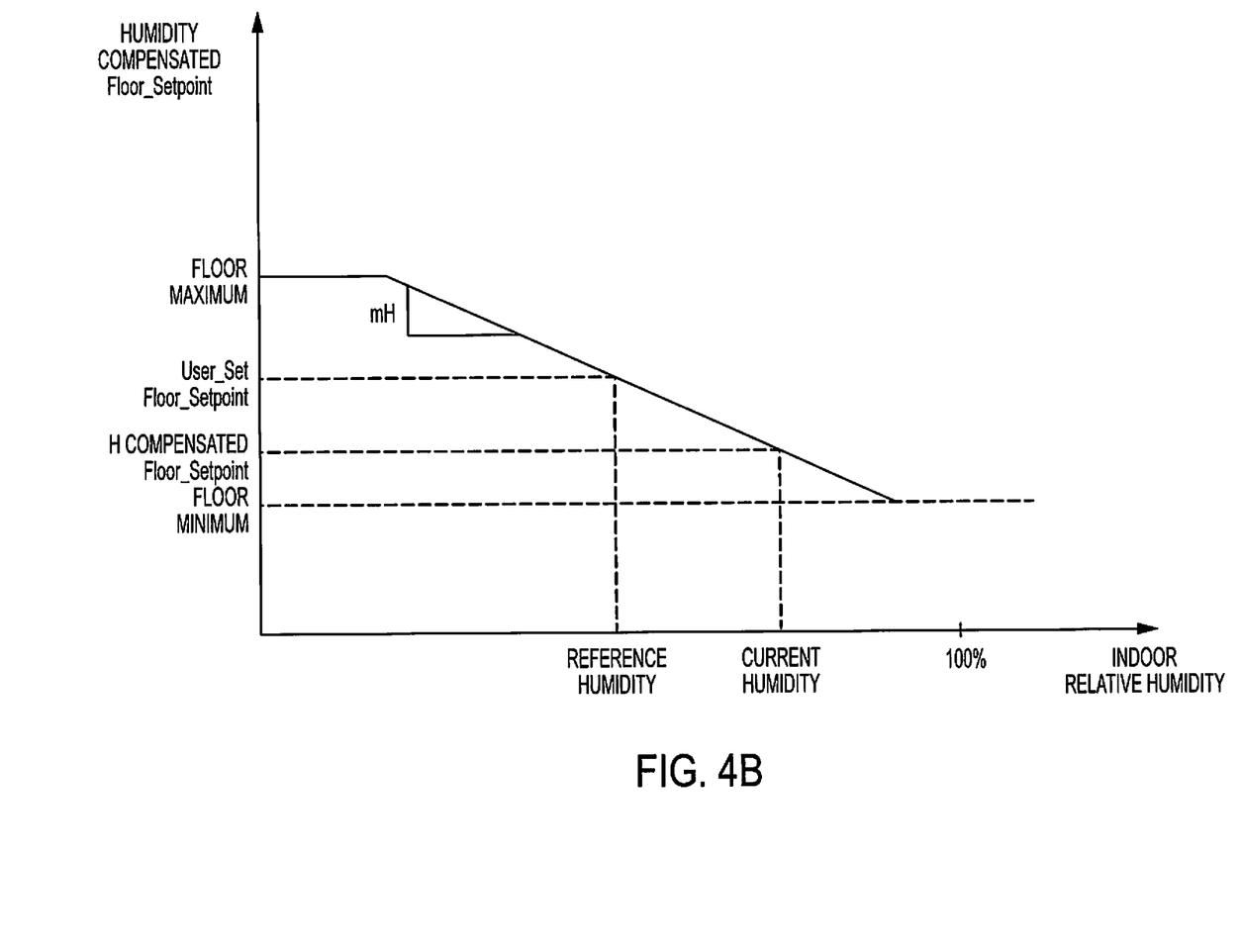
FIG. 4B is graphical chart representing Humidity_Compensated_Floor_Setpoint versus Increasing Indoor Relative humidity illustrating the general principle of indoor humidity compensation in accordance with the subject disclosure.

At step 402, the thermostat controller 120 checks the User_Set_Floor_Setpoint. The User_Set_Floor_Setpoint is the temperature setpoint before weather compensation is applied. Referring additionally to FIG. 4B, the User_Set_Floor_Setpoint is shown on a graph of Humidity_Compensated_Floor_Setpoint versus Indoor Relative Humidity. The Humidity_Compensated_Floor_Setpoint is the final floor setpoint used for floor warming operation when humidity compensation is used. At step 404, the thermostat controller 120 determines the H_Compensated_Floor_Setpoint, which is equal to the User_Set_Floor_Setpoint minus the product of the gain of the weather compensation for humidity (mH) times the difference of the Current Humidity minus a preset Reference Humidity.

The H_Compensated_Floor_Setpoint is also shown on FIG. 4B. FIG. 4B is graphical chart representing Humidity_Compensated_Floor_Setpoint versus Increasing Indoor Relative humidity illustrating the general principle of indoor humidity compensation in accordance with the subject disclosure.

Figure 4C:
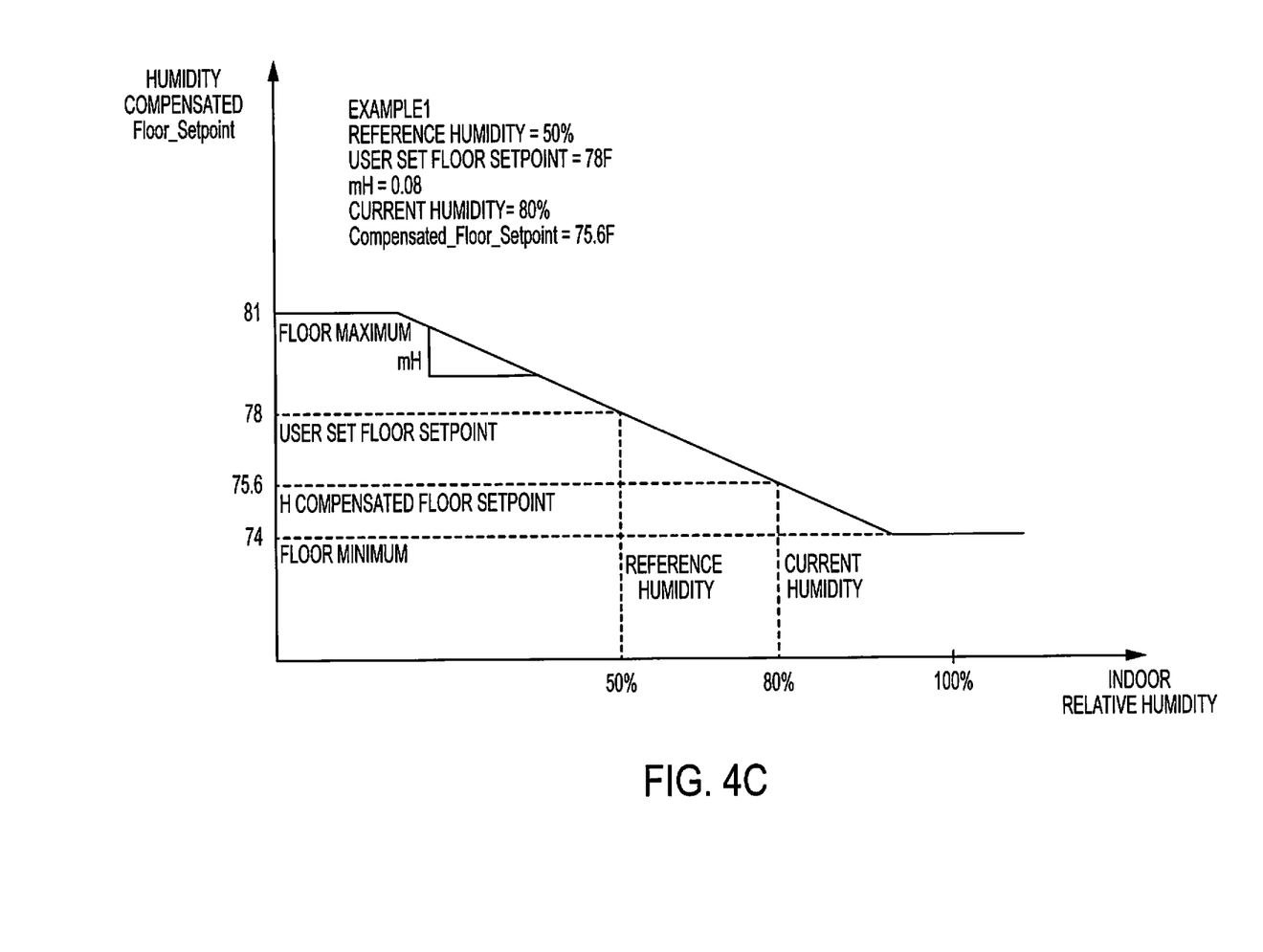
FIG. 4C is graphical chart representing Humidity_Compensated_Floor_Setpoint versus Increasing Indoor Relative Humidity illustrating weather compensation when the indoor relative humidity is greater than the reference humidity in accordance with the subject disclosure.

FIG. 4C is graphical chart representing Humidity_Compensated_Floor_Setpoint versus Increasing Indoor Relative Humidity illustrating weather compensation when the indoor relative humidity is greater than the reference humidity in accordance with the subject disclosure. FIG. 4C includes an example of typical parameters to yield a humidity compensated floor setpoint (H_Compensated_Floor_Setpoint) of 75.6° F. More particularly, the H_Compensated_Floor_Setpoint=78−0.08(80−50)=75.6° F. In another embodiment, mH is equal to 0.2 although it is understood selection of the value of mH is variable depending upon system performance and circumstantial parameters. For example, mT or mH may be in the range of 0.01 to 0.99 or even outside this range.

Still referring to FIG. 4A, at step 406, the thermostat controller 120 determines if the user has elected to turn on weather compensation (Weather_Compensation). If weather compensation is on, the process proceeds to step 410 where the weather compensation algorithm sets the Operational_Floor_Setpoint equal to the H_Compensated_Floor_Setpoint. At step 406, if weather compensation is off, the process proceeds to step 308 wherein the Operational_Floor_Setpoint is made equal to the User-Set_Floor_Setpoint. Both of steps 408 and 410 proceed to step 412.

At step 412, the thermostat controller 120 determines if the Operational_Floor_Setpoint is below a Floor_Minimum. If the Operational_Floor_Setpoint is below the Floor_Minimum, the process proceeds to step 414. If the Operational_Floor_Setpoint is equal to or above the Floor_Minimum, the process proceeds to step 416. At step 414, the Operational_Floor_Setpoint is set equal to the Floor_Minimum and the process proceeds to step 416. At step 416, the thermostat controller 120 determines if the Operational_Floor_Setpoint is above a Floor_Maximum. If the Operational_Floor_Setpoint is above the Floor_Maximum, the process proceeds to step 418. If the Operational_Floor_Setpoint is equal to or below the Floor_Maximum, the process proceeds to step 420. At step 418, the Operational_Floor_Setpoint is set equal to the Floor_Maximum and the process proceeds to step 420. At step 420, the process ends.

In one embodiment, the system 100 utilizes two or more parameters for compensation of the setpoint. For example, outdoor temperature and indoor humidity may both be used to adjust the setpoint (e.g., the processes of FIGS. 3A and 4A are both utilized). Additionally, weather information from the Internet and/or barometric pressure readings may also be used to provide compensation to the setpoint. As the weather information and barometric pressure may provide a predictive insight into the forecast, these parameters may further be used to anticipate weather changes so that adjustment to the setpoint occurs prior to the change when the floor heating systems has a significant period for adjustment. Such nature of the parameter may determine the associated gain value.

Figure 5A:
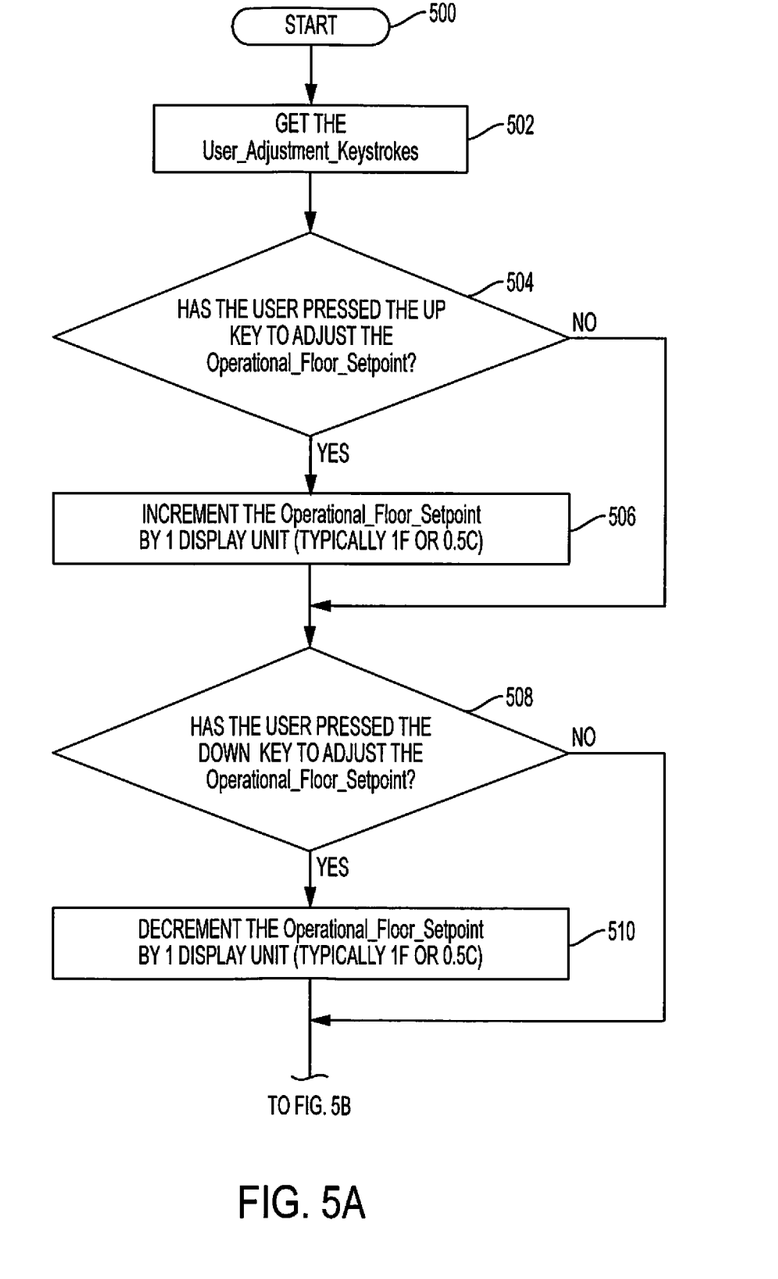
FIGS. 5A and 5B are a flowchart depicting a process for utilizing user adjustments and weather compensation in accordance with the subject disclosure.
Figure 5B:
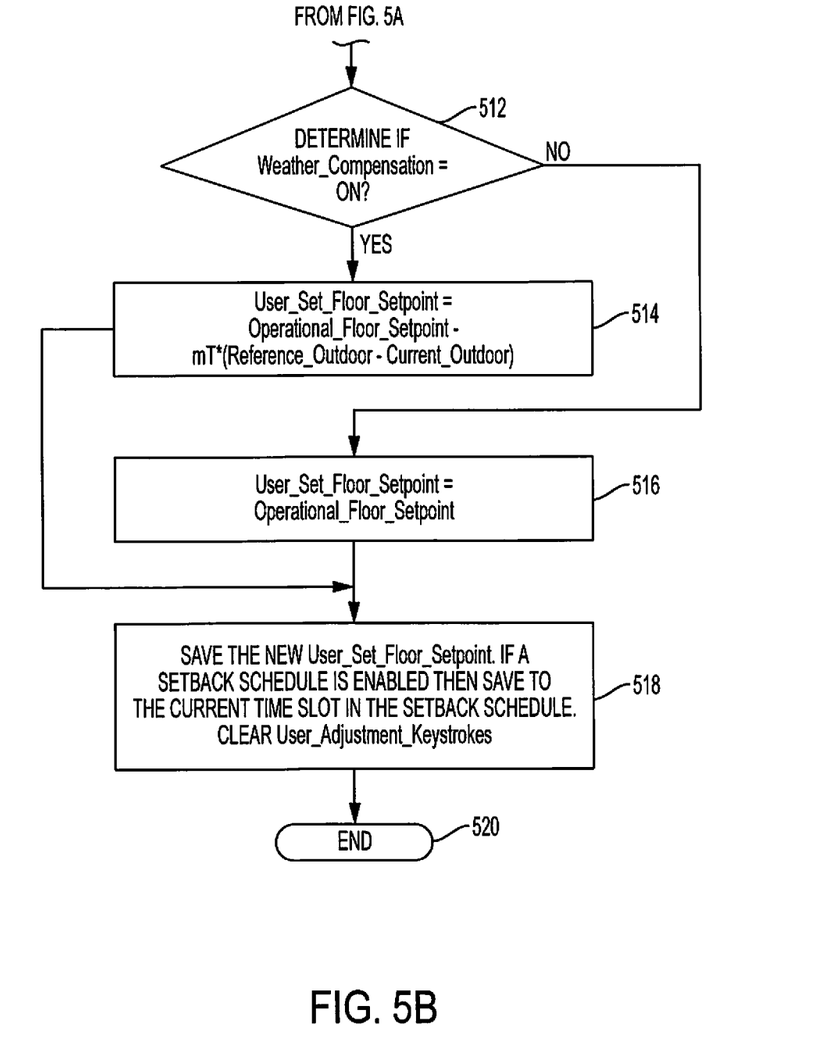

Referring now to FIGS. 5A and 5B, there is illustrated a flowchart depicting a process for utilizing user adjustments and weather compensation in accordance with an embodiment of the present technology. It is envisioned that the keypad 134 of the thermostat controller 120 is utilized by an operator to enter the information as desired. During normal operation, the thermostat controller 120 displays the operational setpoint in area 137d and the current actual floor temperature in area 137e (see FIG. 1). If the user is uncomfortable or wants to make an adjustment, the user can use the up button 135c or the down button 135f of the thermostat controller 120 to increase or decrease the operational setpoint.

However, if weather or other compensation is turned on, the current operational setpoint is calculated from a non-compensated user setpoint. Consequently, a change to the operational setpoint must be converted to a non-compensated setpoint prior to saving the change. The flowchart of FIGS. 5A and 5B illustrates a process for utilizing user adjustments in more detail with exemplary weather compensation turned on. The process of FIGS. 5A and 5B is preferably executed frequently, such as 10 times per second.

At step 500, the process of the flowchart begins. The flowchart begins under ongoing operation circumstances as opposed to an initial start-up condition. At step 502, the thermostat controller 120 checks for and receives signals indicating that the user is utilizing the up button 135c and/or down button 135f (e.g., User Adjustment Keystrokes).

At step 504, the thermostat controller 120 determines if the user has pressed the up button 135c. If the up button 135c has not been pressed, the process proceeds to step 508. If the up button 135c has been pressed, the process proceeds to step 506, where the Operational_Floor_Setpoint is incremented by a unit for each time the up button 135c was pressed and proceeds to step 508. The Operational_Floor_Setpoint is the final floor setpoint used for floor warming operations. In preferred embodiments, the display unit adjustment is 0.1, 0.5 or 1.0° F. Any desired adjustment increment may be used.

At step 508, the thermostat controller 120 determines if the user has pressed the down button 135f. If the down button 135f has not been pressed, the process proceeds to step 512. If the down button 135f has been pressed, the process proceeds to step 510, where the Operational_Floor_Setpoint is decremented by a unit for each time the up button 135c was pressed and proceeds to step 512.

At step 512, the thermostat controller 120 determines if Weather_Compensation is on. Weather_Compensation is a configuration of the system 100 that allows the weather compensation to be selectively turned on or off by the user. If the Weather_Compensation is off, the process proceeds to step 516. At step 516, the Operational_Floor_Setpoint is set equal to the User_Set_Floor_Setpoint because weather compensation is off and the process proceeds to step 518.

Referring back to step 512, if the Weather_Compensation is on, the process proceeds to step 514, where the User_Set_Floor_Setpoint is according to the following formula:

Operational_Floor_Setpoint=User_*Set*_Floor_Setpoint−
mT\*(Reference_Outdoor−Current_Outdoor)

where the Operational_Floor_Setpoint is the final floor setpoint, the User_Set_Floor_Setpoint is the user configured floor setpoint before weather compensation is applied, mT is gain of the weather compensation applied to outdoor temperature, the Reference_Outdoor is the outdoor temperature for which the weather compensation algorithm calculates zero compensation being required to correct the outdoor temperature variance (e.g., T_Compensated_Floor_Setpoint=User_Set_Floor_Setpoint), and the Current_Outdoor is the current outdoor temperature either measured locally or communicated via a network device. After calculating the Operational_Floor_Setpoint at step 514 with weather compensation on, the process proceeds to step 518.

At step 518, the thermostat controller 120 saves the User_Set_Floor_Setpoint. As can be seen, the process 500 of FIGS. 5A and 5B utilizes user adjustments and setting changes to determine and save operational settings. As setting changes and adjustments occur, the Operational_Floor_Setpoint is promptly adjusted for efficient and comfortable operation.

As can be seen from the above, several assumptions are made based on a possible best way for the end user to interact with a thermostat using weather compensation. For example, in the flowchart of FIGS. 5A and 5B, one objective is to determine what the User_Set_Floor_Setpoint is in order to save this value to non-volatile memory (NVM) for subsequent usage to calculate the Operation_Floor_Setpoint at any outdoor temperature.

For example, with the Reference_Outdoor=50° F., mT=0.1, Current outdoor=10° F., assuming that initially the User_Set_Floor_Setpoint saved in NVM is 78° F., the following calculation results. Since the Current_Outdoor is 10° F., the Operational_Floor_Setpoint=78+0.1\*(50−10)=82° F. The target displayed on the thermostat then will be 82° F. and the displayed actual floor temperature will be very close to 82° F. as well. (Note that if the thermostat displayed the target as 78° F. and an actual floor of 82° F., user confusion would likely result in the users would think that the floor is overheating and not maintaining target, possibly resulting in further undesirable adjustments.

Further, for whatever reason, if the end user wants the floor a bit warmer. She adjusts the thermostat by pressing the up button 135*c* to increase the temperature, the target is incremented starting from the currently displayed target, i.e. 82° F. While starting from a User_Set_Floor_Setpoint of 78° F. is an option, this would again be confusing to the end user since that target is not the same as was displayed prior to user adjustment. So since the user is adjusting the operational temperature, the thermostat must convert that value back to a User_Set_Floor_Setpoint at the reference temperature (50° F.) for storage to NVM. For example, the user adjusts the displayed (operational) target to 83° F. The new User_Set_Floor_Setpoint=83−0.1\*(50−10)=79° F. This value of 79° F. will be the value saved to NVM.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules, databases, interfaces, computers, servers and the like) shown as distinct for purposes of illustration may be incorporated within other functional elements in a particular implementation.

All patents, patent applications and other references disclosed herein are hereby expressly incorporated in their entireties by reference. While the subject technology has been described with respect to preferred embodiments, those skilled in the art will readily appreciate that various changes and/or modifications can be made to the subject technology without departing from the spirit or scope of the invention as defined by the appended claims.

What is claimed is:

1. A floor warming system comprising:
   floor warming elements for coupling to a floor; a first sensor assembly for generating a first signal indicative of at least one of a floor temperature and a floor warming element temperature;
   a thermostat controller for receiving the first signal, receiving a second signal indicating an ambient outdoor temperature, receiving a third signal indicating barometric pressure, and controlling operation of the floor warming elements, the thermostat controller including: memory storing an instruction set and data related to a user setpoint; and a display for presenting information to a user; and
   a processor for running the instruction set, the processor being in communication with the memory, wherein: the processor is configured to calculate an operational floor setpoint based on the first signal, the second signal, the third signal and the user setpoint; and the operational floor setpoint is equal to the user setpoint plus a product of a gain constant times a difference of a reference outdoor temperature minus the ambient outdoor temperature.

2. A floor warming system as recited in claim 1, wherein the reference outdoor temperature being an outdoor temperature for which zero compensation is required.

3. A floor warming system as recited in claim 2, wherein the gain constant is user-selectable.

4. A floor warming system as recited in claim 2, wherein the gain constant is in a range of 0.09 to 0.21.

5. A floor warming system as recited in claim 1, wherein the processor is further operative to: determine if the operational floor setpoint is below a predetermined minimum, wherein if the operational floor setpoint is below the predetermined minimum, the operational floor setpoint is reset equal to the predetermined minimum; and subsequently, determine if the operational floor setpoint is above a predetermined maximum, wherein if the operational floor setpoint is above the predetermined maximum, the operational floor setpoint is reset equal to the predetermined maximum.

6. A floor warming system as recited in claim 1, wherein the thermostat controller has a keypad for manually increasing and decreasing the operational floor setpoint and the processor is further configured to, when a manual adjustment of the operational floor setpoints occurs, calculate a non-compensated operational floor setpoint based on the manual adjustment so that the non-compensated operational floor setpoint is used to generate a displayed temperature on the display that is approximately equal an actual temperature of the floor warming elements.

7. A floor warming system comprising:
floor warming elements for coupling to a floor;
a first sensor assembly for generating a first signal indicative of at least one of a floor temperature and a floor warming element temperature; and
a thermostat controller for receiving the first signal and receiving a second signal indicating an ambient outdoor temperature, the thermostat controller including: memory storing an instruction set, a gain constant, a reference outdoor temperature, and data related to a user setpoint; and a processor for running the instruction set, the processor being in communication with the memory,
wherein: the processor is configured to: calculate an operational floor setpoint equal to the user setpoint plus a product of the gain constant times a difference of the reference outdoor temperature minus the ambient outdoor temperature; and control operation of the floor warming elements based on the first signal and the operational floor setpoint.

* * * * *